United States Patent [19]
Kobori

[11] 3,952,316
[45] Apr. 20, 1976

[54] AUTOMATIC DIAPHRAGM APERTURE CONTROL DEVICE FOR PHOTOGRAPHIC CAMERA

[75] Inventor: Toshio Kobori, Sakai, Japan

[73] Assignee: Minolta Camera Kabushiki Kaisha, Japan

[22] Filed: Aug. 19, 1974

[21] Appl. No.: 498,730

[30] Foreign Application Priority Data
Aug. 27, 1973 Japan................................ 48-95260

[52] U.S. Cl.................................. 354/40; 354/46; 354/272
[51] Int. Cl.².......................... G03B 7/12; G03B 9/02
[58] Field of Search ................... 354/40, 43, 46, 47, 354/26, 29, 30, 36, 38, 270–274

[56] References Cited
UNITED STATES PATENTS

| | | | |
|---|---|---|---|
| 3,292,516 | 12/1966 | Sato et al. | 354/43 X |
| 3,393,619 | 7/1968 | Albedyll et al. | 354/43 |
| 3,526,174 | 9/1970 | Wagner | 354/43 |

*Primary Examiner*—L. T. Hix
*Assistant Examiner*—James LaBarre
*Attorney, Agent, or Firm*—Watson, Cole, Grindle & Watson

[57] ABSTRACT

In a photographic camera which controls a diaphragm aperture to an optimum aperture automatically, wherein the light from a photographic object which has been transmitted through an objective lens and a diaphragm aperture is measured by means of a light measuring device, as the diaphragm aperture for the objective lens, in its fully open condition is being stopped down from its fully open condition in association with the releasing operation of a shutter, the stop-down operation of the diaphragm aperture then being interrupted when the light measuring output becomes coincident with a value corresponding to a predetermined shutter speed, an improved automatic diaphragm aperture control device in which the movement of an interlocking pin for the objective lens in association with the operation of a diaphragm ring is transmitted to an operating lever within the body of a camera, which lever cooperates with the aforesaid operation of the diaphragm ring through the medium of a movement-enlarging mechanism which is adapted to enlarge the movement of the lever, as the diaphragm aperture is being stopped down, and then the aforesaid operating lever is locked by means of a locking pawl adapted to be operated by means of the aforesaid light measuring output, for controlling the diaphragm aperture.

8 Claims, 5 Drawing Figures

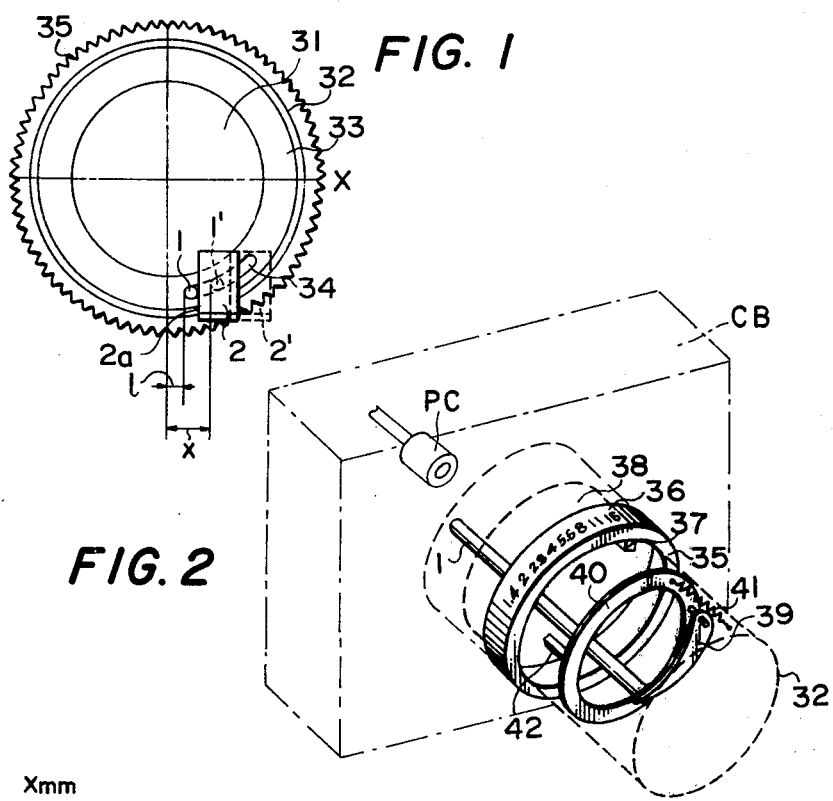
FIG. 1
FIG. 2
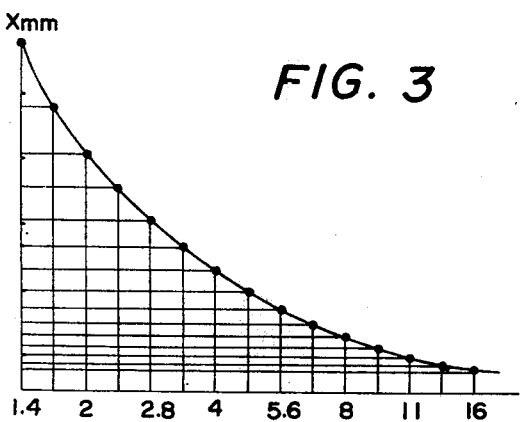
FIG. 3

AUTOMATIC DIAPHRAGM APERTURE CONTROL DEVICE FOR PHOTOGRAPHIC CAMERA

BACKGROUND OF THE INVENTION

This invention relates to an automatic diaphragm aperture control photographic camera for automatically controlling the diaphragm aperture to an optimum aperture value by interrupting the stop-down operation of the diaphragm according to the output of the light from a photographic object, which light has been transmitted through an objective lens and the diaphragm aperture, as the diaphragm aperture is being stopped down from its fully open condition.

An exposure control device for a photographic camera has been heretofore known wherein a light measuring device measures the light from a photographic object, in which light has been transmitted through an objective lens and a diaphragm aperture for effecting a stop-down operation, with the diaphragm aperture being stopped sown from its fully open condition in association with the shutter releasing operation. Then, an interlocking pin which cooperates with this stop-down operation is locked by means of a locking member according to a light measuring output, thereby controlling the diaphragm aperture to an optimum aperture value corresponding to the shutter speed which has been selected beforehand, commensurate with the brightness of the photographic object.

However, such exposure control device presents disadvantages which will be described hereinafter. For example, the diaphragm aperture providded for the objective lens is governed by the movement of diaphragm blades which are operated by means of a diaphragm ring. This is so even if diaphragm graduations are provided at an equal spacing, and the extent of the movement of the diaphragm blades required for stopping down the diaphragm aperture by a one step operation becomes less as the diaphragm aperture becomes smaller. This in turn leads to difficulties in controlling the moving extent of the interlocking pin by means of the aforesaid locking member, when the diaphragm aperture has been stopped down to some extent.

OBJECTS OF THE INVENTION

These disadvantages are readily avoided by the present invention.

It is accordingly an object of the present invention to provide an automatic diaphragm aperture control device for a photographic camera wherein the light from a photographic object which has passed through a diaphragm aperture is measured as the diaphragm aperture is being stopped down from its full open condition, and then an interlocking pin which cooperates with the stop-down operation of this diaphragm aperture is locked by means of a locking member according to a light measuring output corresponding to a shutter speed which has been selected beforehand. The automatic diaphragm aperture control device presents consistent accuracy for the control throughout the entire range of the diaphragm aperture controlled.

It is another object of the present invention to provide an automatic diaphragm aperture control device for use in a photographic camera, wherein the light from a photographic object which has passed through a diaphragm aperture is measured as the diaphragm aperture is being stopped down from its fully open condition, and then an interlocking pin which cooperates with such stop-down operation of the diaphragm aperture is locked by means of a locking member according to the light measuring output corresponding to a shutter speed which has been selected beforehand. The automatic diaphragm control device effects positive diaphragm aperture control for the diaphragm aperture which has been stopped down to some extent by causing such locking member to lock the interlocking pin through the medium of an enlarging mechanism which is adapted to enlarge the movement of the aforesaid interlocking pin, as the diaphragm aperture is being stopped down.

SUMMARY OF THE INVENTION

According to the present invention, there is provided an automatic diaphragm aperture control device for use in a photographic camera of the type in which the light from a photographic object which has been transmitted through an objective lens and the aforesaid diaphragm aperture is measured, as the diaphragm aperture is being stopped down from its fully open condition, preparatory to the commencement of exposure in association with the releasing operation of a shutter. Then, such stop-down operation is interrupted by means of a locking member which is adapted to be operated according to the aforesaid light measuring output, when the light measuring output reaches a value optimum to a preselected shutter speed. The automatic diaphragm aperture control device is characterized in that an interlocking pin transmits the stop-down operation of diaphragm blades for the objective lens inside a camera body, and the movement of the interlocking pin is transmitted through the medium of a movement enlarging mechanism to an operating lever as the diaphragm aperture is being stopped down by means of the aforesaid diaphragm blades, whereby a locking member interrupts the operation of an operating lever according to the aforesaid light measuring output for controlling diaphragm aperture.

The movement-enlarging mechanism enlarges the movement of the interlocking pin so as to permit the consistent extent of movement of the operating lever relative to the movement of the interlocking pin for stopping down the diaphragm aperture from a given aperture value by one step. Accordingly, the operating lever may move to a consistent extent when the diaphragm aperture is varied by one step, even if the diaphragm aperture is at any aperture value, whereby the locking member accurately but positively locks the operating lever according to a light measuring output, during the movement of the operating lever. This accurate locking of the operating lever results in an accurate automatic control of the diaphragm aperture to an optimum aperture value.

BRIEF DESCRIPTION OF THE DRAWINGS

FIG. 1 is a rear view of an exchangeable lens mount of one embodiment of the present invention;

FIG. 2 is a perspective view of a diaphragm aperture device disposed within the exchangeable lens;

FIG. 3 is a graph showing the position of an interlocking pin at varying diaphragm aperture values of an exchangeable lens shown in FIGS. 1 and 2;

DETAILED DESCRIPTION OF THE INVENTION

Figure 4:
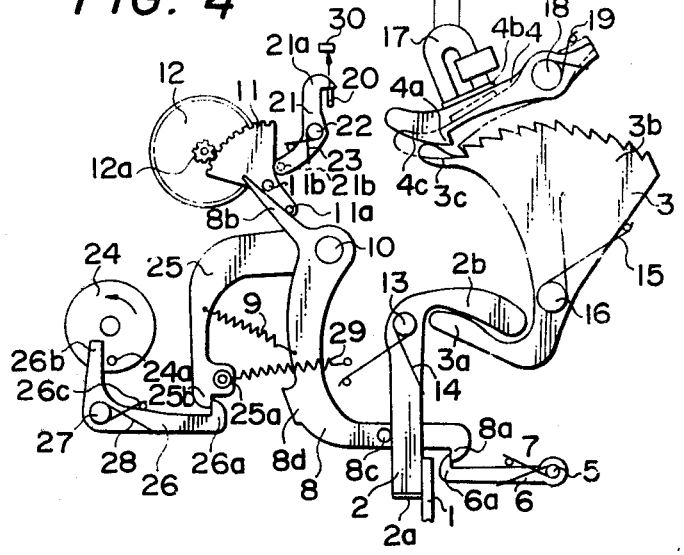
FIG. 4 is a top view of the construction of the essential part of one embodiment of the automatic diaphragm aperture control device according to the present invention.

FIG. 1 is a rear view of the essential part of an exchangeable lens mount embodying the present invention. Surrounding an objective lens 31 is a fixed ring 32, around which is rotatably mounted an adjusting ring 35. As shown in FIG. 2, a diaphragm aperture in its fully open position is adjusted to a desired aperture value required for exposure by bringing the diaphragm aperture graduations on the diaphragm adjusting ring 36 in alignment with an index 38 on the fixed ring 32.

An elongated arcuate slot 34 is provided in an annular back plate 33. Such plate surrounds the outer periphery of objective lens 31 but lies radially inwardly of fixed ring 32. An interlocking pin 1 extends through slot 34 in the direction toward a camera body CB.

Interlocking pin 1 is adapted to rotate diaphragm blades 39 (only one of blades 39 being shown) and extends from a diaphragm ring 40 in a projecting manner for governing the diaphragm aperture. Diaphragm ring 40 is spring loaded by means of a spring 41 for rotation in the clockwise direction as viewed in FIG. 2. Accordingly, interlocking pin 1 tends to shift along elongated slot 34 from a left and downward location to a right and upward location. Thus, when pin 1 is positioned at its left and downward location, the diaphragm will be in its open position, and when it is positioned in its right and upward location, the diaphragm will be in its minimum diaphragm aperture position. When a pin 42 projecting from diaphragm ring 40 is rotated in a clockwise direction as viewed in FIG. 2, ring 40 will engage a projection inwardly of diaphragm adjusting ring 35 commensurate with the diaphragm aperture to be adjusted, to thereby stop its rotation, whereby diaphragm adjusting ring 35 presents an adjusted diaphragm aperture.

Thus, it is possible that, prior to exposure, the diaphragm may be stopped down to a diaphragm aperture set on diaphragm adjusting ring 35, or it is also possible that the diaphragm aperture may be controlled by means of an automatic diaphragm aperture control device, with diaphragm adjusting ring 35 set to the minimum diaphragm aperture.

In the event an exchangeable lens mount is mounted on camera body, interlocking pin 1 is engageable with a control lever 2 on the camera body CB as shown in FIG. 1.

As has been described, interlocking pin 1 moves in association with the movement of diaphragm blade 39. The diaphragm device in general has equally spaced graduations thereon. However, the extent of the movement of diaphragm blades 39 for stop-down action will be extremely small as when stopped down from $f{:}11$ to $f{:}16$, as compared to when it is stopped down from $f{:}2$ to $f{:}2.8$. This signifies that the smaller the diaphragm aperture, the smaller the extent of the movement of interlocking pin 1. This is best shown in FIG. 3 wherein, as the diaphragm aperture is being reduced, the extent of the movement of interlocking pin 1 decreases along a quadratic curve. For example, the extent of movement of interlocking pin 1 in the direction along axis X in FIG. 1 will be only 0.21 mm when the diaphragm is stopped down from $f{:}11$ to $f{:}16$. Clearly then, such a small extent of movement of interlocking pin 1 is hardly accurate but is automatically controlled by a locking member to an optimum diaphragm aperture, thus resulting in a decreased accuracy of the diaphragm aperture control.

FIG. 4 shows one embodiment of the present invention including a pivotally mounted control lever 2 serving as a control member for controlling interlocking pin 1. An operating lever 3 has a ratchet 3b for locking engagement with a locking member 4, and lever 3 cooperates with lever 2 so as to be moved thereby. The engaging portions between control lever 2 and operating lever 3 provide a cam mechanism, whereby the extent of movement of control lever 2 for a small diaphragm aperture is enlarged and is transmitted to operating lever 3, whereupon operating lever 3 is locked by locking member 4 when an optimum diaphragm aperture is attained. This permits the proper control of movement of interlocking pin 1 by means of control lever 2 for any diaphragm aperture, while using ratchet 3b whose tooth spacing is equally provided.

Control lever 2 has a bent portion 2a extending perpendicularly to locking pin 1 and is engageable therewith as shown. Lever 2 is mounted for pivotal movement about a shaft 13 on the bottom plate of the camera body, and is spring loaded by a spring 14 for rotation in a clockwise direction.

A braking lever 8, having a pin 8c thereon engaging the left edge of control lever 2 shown in FIG. 4, is mounted for pivotal movement about a shaft 10 on the camera body, and is spring loaded for clockwise rotation by a spring 9 interconnecting lever 8 with a return lever 25 to be more fully hereinafter described. An arresting lever 6 is mounted for pivotal movement about a shaft 5 on the camera body, and is spring loaded by a spring 7 for clockwise rotation. Pawl 6a of lever 6 engages with pawl 8a of lever 8 for effecting rotation thereof. A sector gear 11 is mounted for pivotal movement about a shaft 11b on the camera body, and is urged in a clockwise direction of movement by a weak spring (not shown). Tail portion 8b of lever 8 engages a pin 11a of gear 11 for effecting rotation of the lever. Sector gear 11 is in constant meshing engagement with a gear 12a of a slow governor 12.

A mirror locking lever 21 is spring loaded by a spring 23 for rotation in a clockwise direction, and is pivotally mounted about a shaft 22 on the camera body. A hook portion 21a on one arm of mirror locking lever 21 is engageable with a mirror drive member 20, while a pin 21b on the other arm thereof is located in the rotating locus of tail portion 8b of braking lever 8 and hence is engageable with the tail portion 8b. When mirror drive member 20 is released from engagement with hook portion 21a, member 20 will move upwardly for rotating the mirror (not shown). Upon completion of rotation of the mirror, drive member 20 will drive a shutter releasing member 30 so as to release the shutter.

Operating lever 3 has a cam portion 3a engaging a bent portion 2b formed on one arm of control lever 2, and is mounted for pivotal movement about a shaft 16 on the camera body. Lever 3 is spring loaded by a weak spring 15 for rotation in a clockwise direction, and cam portion 3a is in constant engagement with bent portion 2b. Also, operating lever 3 has a ratchet 3b on its other arm.

Locking lever 4 has a pawl 4a engageable with ratchet 3b, and is mounted for pivotal movement about a shaft 18 on the camera body. Lever 4 has an armature thereon, and is provided with a spring 19 urging pawl 4a in a direction of engagement with ratchet 3b. Also, lever 4 has a curved portion 4c engageable with projection 3c located at the left end of ratchet 3b of operating lever 3, with an electromagnet 17 disposed in opposed relation to armature 4b. Thus, when projection 3c engages curved portion 4c, locking lever 4 will be rotated in a manner that the pawl 4a will be retracted from ratchet 3b against the action of spring 19, thereby bringing armature 4b in abutting relation to electromagnet 17. Then, when electromagnet 17 is excited, armature 4b will be attracted to this retracted position.

Return lever 25 is pivotally journaled on shaft 10 and is spring loaded for rotation in a counterclockwise direction by a strong spring 29 connecting an arm thereof with the camera body. Lever 25 has a projection 25a and a hook portion 25b, projection 25a being adapted to abut and engage an abutting surface 8d of braking lever 8, when lever 8 is rotated in the clockwise direction by means of spring 9. An arresting lever 26 has a pawl 26a engageable with hook portion 25b, and is pivotally journalled on a shaft 27. Lever 26 is spring loaded by a spring 28 for rotation in a counterclockwise direction until it abuts against a stopper 26c. An arm 26b of lever 26 extends above a rear curtain shaft rotating in the direction of the arrow of FIG. 4, and thus is engageable with a pin 24a, provided on rear curtain shaft 24, when the rear curtain travels.

The arrangement of bent portion 2b and cam 3a is such that, as the rotational angle of control lever 2 is increased, the rotational angle of operation lever 3 relative to a unit rotational angle of control lever 2 will be increased.

Electromagnet 17 is excited in association with the releasing operation. Thus, when the output of the light measuring circuit, having a light measuring element or photo-cell PC adapted to receive the light from a photographic object, which light has passed through the aforesaid diaphragm aperture, reaches a preset value of a shutter speed, then electromagnet 17 will be demagnetized by way of a switching circuit according to the aforesaid output.

In operation, in the cocked condition as shown in FIG. 4, projection 3c of operating lever 3 will engage bent portion 4c to thereby rotate the locking lever in a clockwise direction against the action of spring 19, and pawl 4a of lever 4 will be disengaged from ratchet 3b. Furthermore, hook portion 8a of braking lever 8 will engage pawl 6a of arresting lever 6, control lever 2 will arrest interlocking pin 1 to a position where the diaphragm is fully opened, mirror locking lever 21 will lock mirror drive member 20, and pawl 26a of arresting lever 26 will engage hook portion 25b of return lever 25. Accordingly, springs 15, 14, 9, 29 are tensioned, as well as the shutter.

Under such a condition, when the releasing operation is effected, then electromagnet 17 will be excited, after which arresting lever 6 will be rotated in a counterclockwise direction against the action of spring 7 so that braking lever 8 will be released from its locked condition. Thus, braking lever 8 will rotate in a clockwise direction under the action of the tensioned spring 9, while being controlled by the aforesaid control governer 12.

Control lever 2 is also rotated in a clockwise direction, following the rotation of braking lever 8 under the action of tensioned spring 14, while interlocking pin 1 will follow the rotation of control lever 2 to thereby stop down the diaphragm from its fully open condition. Moreover, control lever 3 will rotate clockwise to the extent allowed by bent portion 2b in engagement with cam portion 3a, in a manner that the movement of control lever 3 will be enlarged by means of cam portion 3a as the rotational angle of control lever 2 is being increased, i.e., the diaphragm is being stopped down.

When the light measuring output given by the light measuring element, which is receiving the light from the object which has passed the diaphragm aperture, is lowered, and then reaches a given value corresponding to the preselected shutter speed, the electric feed to electromagnet 17 will be interrupted by the switching circuit, whereupon locking lever 4 will rotate counterclockwise under the action of spring 19 and pawl 4a of locking lever 4 will engage ratchet 3b to thereby lock operating lever 3 in position. This will cause the control lever engaging lever 3, to stop its rotation, while the diaphragm is adjusted to an optimum diaphragm aperture corresponding to the brightness of the photographic object, film sensitivity and the shutter speed.

On the other hand, braking lever 8 will continue rotating, while the tail portion thereof will engage pin 21b to thereby rotate mirror locking lever 21 counterclockwise against the action of spring 23, thereby releasing the locked condition of mirror drive member 20 and rotating the movable mirror. Upon completion of rotation of the mirror, mirror drive member 20 will drive shutter releasing member 30 to release the shutter.

When the travel of the rear curtain at a preset shutter speed has been completed and the exposure has been completed, then pin 24a will engage arresting lever 26 to thereby rotate same clockwise, thereby releasing the condition of return lever 25 arrested by means of arresting lever 26 so that return lever 25 will rotate counterclockwise by means of tensioned spring 29, while projection 25a will engage abutting surface 8d of braking lever 8 to urge lever 8 in a counterclockwise direction, during which pin 8c will engage control lever 2 to rotate same counterclockwise to drive interlocking pin 1 so as to bring the diaphragm in its open condition. In cooperation therewith, operating lever 3 will also rotate clockwise to thereby cause projection 3c to return locking lever 4 to a clockwise rotated position as shown in FIG. 3, by means of bent portion 4c.

In association with the completion of exposure, mirror drive member 20 will be returned to a position shown in FIG. 3 by means of a known quick-return mechanism (not shown) of the movable mirror, thereby again engaging mirror locking lever 21.

Return lever 25 will be rotated clockwise in association with the shutter winding operation and again engage arresting lever 26, thus returning to the cocked position as shown in FIG. 4, completely.

Figure 5:
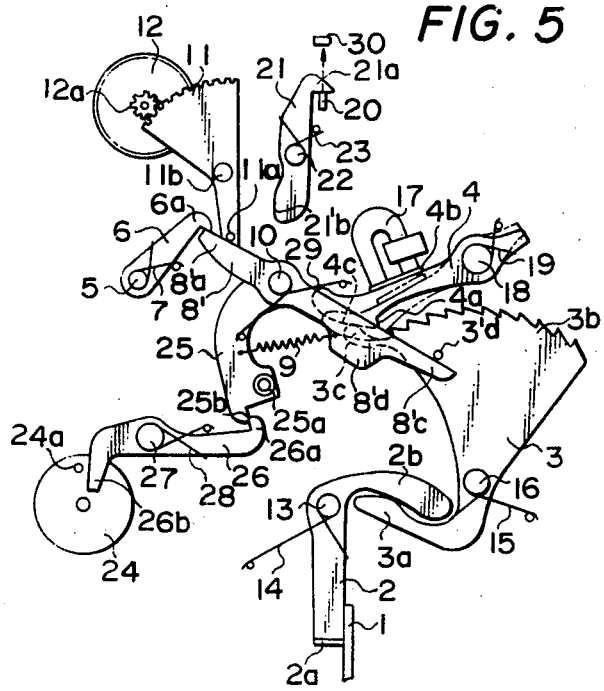
FIG. 5 is a top view of the construction of the essential part of another embodiment.

According to the aforedescribed embodiment, braking lever 8 engages control lever 2. In contrast thereto, according to another embodiment shown in FIG. 5, a braking lever 8' engages operating lever 3. More particularly, an arm 8'c of braking lever 8' engages a pin 3d' of operating lever 3, whereby the rotational speed of operating lever 3 is controlled by means of governer mechanism 12, while the other arm 8'a of lever 8 is engageable with arresting lever 6 as well as with pin 11a of sector gear 11.

In this embodiment, operating lever 3 will rotate at a given speed and the extent of the rotation between the diaphragm values is maintained constant. In addition, interlocking pin 1 follows a curved movement as shown in FIG. 3 through the medium of control lever 2 by means of cam portion 3b, so that the delay in the movement of arresting lever 4 due to electromagnet 17 as well as the delay resulting from the mechanical arrangement may be readily adjusted beforehand, thereby effecting a further improved accuracy to the automatic control for a diaphragm.

While the described embodiments represent the preferred forms of the present invention, it is to be understood that modifications will occur to those skilled in the art without departing from the spirit of the invention. The scope of the invention is therefore to be determined solely by the appended claims.

What is claimed is:

1. In an automatic diaphragm control device for a camera of the type to which an interchangeable objective lens is adaptable, said interchangeable objective lens having diaphragm, diaphragm driving means and an operating member coupled with said diaphragm driving means to determine the diaphragm aperture of said diaphragm as a function of position of said operating member so that the diaphragm of the objective may be controlled by a mechanism of said camera body through the operating member, said diaphragm control device comprising:

a retaining member for retaining said operating member in an initial position for holding the diaphragm fully open;

means for releasing the retention in response to a shutter releasing operation to stop down the diaphragm from a fully open position to a position preceding or at a terminal position thereof;

a light measuring circuit having a photoelectric member receiving scene light through said objective lens and said diaphragm;

a control circuit coupled with said photoelectric member for generating a control signal when the output of said light measuring circuit has reached a predetermined value;

a control member movable along a path so that the control member can be stopped at any desired position in the path;

an electromagnetic means responsive to said signal to stop said control member; and an intermediate mechanism for interlocking said operating member with said control member so that the movement of the former accompanies the movement of the latter and that the position of the former corresponds to that of the latter, said intermediate mechanism including a first lever movable with said operating member and a second lever movable with said control member, said levers respectively having cam surfaces in contacting engagement with one another to transmit the movement of said operating member to said control member so that the amount of movement of said control member is increased for the same amount of movement of said operating member as said operating member moves in a direction to reduce the diaphragm aperture.

2. An automatic diaphragm control device as claimed in claim 1, further comprising means for controlling the moving speed of said first lever.

3. An automatic diaphragm control device as claimed in claim 2, wherein said control means includes a governor mechanism linked with said first lever.

4. An automatic diaphragm control device as claimed in claim 1, further comprising means for controlling the moving speed of said second control lever.

5. An automatic diaphragm control device as claimed in claim 4, wherein said control means includes a governor mechanism linked with said second lever.

6. An automatic diaphragm control device as claimed in claim 1, further comprising means for permitting shutter release operation after said electromagnetic means stops said operating member.

7. An automatic diaphragm control device as claimed in claim 1, further comprising means for operating said operating member to open said diaphragm fully in response to termination of exposure.

8. An automatic diaphragm control device as claimed in claim 1, wherein said cam surfaces are so constructed that said control member is moved substantially linearly with respect to changes in diaphragm value corresponding to the position of said operating member.

* * * * *